(12) United States Patent
Suzuki et al.

(10) Patent No.: US 11,125,730 B2
(45) Date of Patent: Sep. 21, 2021

(54) FLOW PASSAGE UNIT

(71) Applicant: ALPS ALPINE CO., LTD., Tokyo (JP)

(72) Inventors: Yoshimune Suzuki, Tokyo (JP); Setsuo Ishibashi, Tokyo (JP); Yoshihiro Taguchi, Tokyo (JP); Satoshi Kawamura, Tokyo (JP); Junko Ito, Tokyo (JP); Hiroyoshi Minaguchi, Kyoto (JP)

(73) Assignee: ALPS ALPINE CO., LTD., Tokyo (JP)

( * ) Notice: Subject to any disclaimer, the term of this patent is extended or adjusted under 35 U.S.C. 154(b) by 233 days.

(21) Appl. No.: 15/834,252

(22) Filed: Dec. 7, 2017

(65) Prior Publication Data

US 2018/0100836 A1 Apr. 12, 2018

Related U.S. Application Data

(63) Continuation of application No. PCT/JP2016/064426, filed on May 16, 2016.

(30) Foreign Application Priority Data

Jun. 10, 2015 (JP) .............................. JP2015-117791
Dec. 28, 2015 (JP) .............................. JP2015-256212

(51) Int. Cl.
*G01N 30/32* (2006.01)
*B01D 15/14* (2006.01)
(Continued)

(52) U.S. Cl.
CPC ............. *G01N 30/32* (2013.01); *B01D 15/14* (2013.01); *B01D 15/1885* (2013.01);
(Continued)

(58) Field of Classification Search
CPC .. G01N 30/32; G01N 30/482; G01N 30/6047; B01D 15/14; B01D 15/1885; B01D 15/22
(Continued)

(56) References Cited

U.S. PATENT DOCUMENTS

| | | | |
|---|---|---|---|
| 6,887,384 B1 * | 5/2005 | Frechet | .................... B01J 20/26 210/198.2 |
| 2003/0002438 A1 | 1/2003 | Yazaki et al. | |

(Continued)

*Primary Examiner* — Matthew D Krcha
*Assistant Examiner* — Jacqueline Brazin
(74) *Attorney, Agent, or Firm* — Hunton Andrews Kurth LLP

(57) ABSTRACT

A flow passage unit has a column for used in a liquid chromatograph and a support body that supports the column. The column has: a porous stationary phase; a porous pressure adjusting part disposed at least at the flow-in end of the stationary phase, a liquid entering the flow-in end, the pressure adjusting part being harder than the stationary phase; and a covering part that covers the stationary phase and pressure adjusting part. The support body has a first plate and a second plate that are mutually joined, the support body forming a column holding part and a liquid flow passage, the column holding part holding the column between the first plate and the second plate, the liquid flow passage communicating with the column holding part. Pressure applied from the first plate and second plate to the pressure adjusting part is higher than pressure applied to the stationary phase.

20 Claims, 10 Drawing Sheets

(51) Int. Cl.
  *B01D 15/18*   (2006.01)
  *B01D 15/22*   (2006.01)
  *G01N 30/60*   (2006.01)
  *B01J 20/281*  (2006.01)
  *G01N 30/02*   (2006.01)

(52) U.S. Cl.
  CPC ........... *B01D 15/22* (2013.01); *G01N 30/482* (2013.01); *G01N 30/6047* (2013.01); *G01N 2030/027* (2013.01)

(58) Field of Classification Search
  USPC ........................................................ 422/70
  See application file for complete search history.

(56) References Cited

U.S. PATENT DOCUMENTS

| | | | |
|---|---|---|---|
| 2004/0053422 A1 | 3/2004 | Chan et al. | |
| 2004/0238447 A1* | 12/2004 | Cheong | B01D 15/22 210/656 |
| 2005/0169829 A1* | 8/2005 | Dai | C01B 32/00 423/445 R |
| 2005/0252772 A1* | 11/2005 | Paul | B01D 61/18 204/450 |
| 2012/0241379 A1* | 9/2012 | Gebauer | G01N 30/606 210/656 |
| 2017/0296943 A1* | 10/2017 | Lorantfy | B01D 15/1892 |

* cited by examiner

FLOW PASSAGE UNIT

CLAIM OF PRIORITY

This application is a Continuation of International Application No. PCT/JP2016/064426 filed on May 16, 2016, which claims benefit of Japanese Patent Application No. 2015-117791 filed on Jun. 10, 2015 and No. 2015-256212 filed on Dec. 28, 2015. The entire contents of each application noted above are incorporated herein by reference.

BACKGROUND OF THE INVENTION

1. Field of the Invention

The present invention relates to a flow passage unit that has a column for use in a liquid chromatograph and also has a support body that supports the column.

2. Description of the Related Art

Liquid chromatography is an analysis method in which an eluant, which is a mobile phase, is injected into a column having a stationary phase such as a porous body together with a sample, after which qualitative analysis and quantitative analysis are performed on the basis that the components of a sample are separated into individual components in the stationary phase.

International Publication No. 2013/121889 discloses a microchannel device that has a structure making a liquid or gas less likely to leach out to the outside of a processing body. In this microchannel device, the processing body has a covering layer, made of a synthetic resin, that encloses a porous body. Therefore, air-tightness and liquid-tightness can be made high between the porous body and the inner surface of a main body, and the porous body enables fluids to be mixed and react efficiently.

However, in a flow passage unit that supports a column by sandwiching it between plates, if tight contact between either or both plates and the column is low, liquid feeding withstand pressure is lowered. If tight contact is made high between the plate and the column, liquid feeding withstand pressure is raised, but the column is collapsed more than necessary and the passing of the liquid is impeded. In either case, reduction in a theoretical plate number and deterioration in a symmetry factor are caused in analysis.

SUMMARY OF THE INVENTION

The present invention provides a flow passage unit that can achieve both improvement in liquid feeding withstand pressure and improvement in analytical performance.

To solve the above problems, a flow passage unit in the present invention is a flow passage unit that has a column for used in a liquid chromatograph and also has a support body that supports the column. The flow passage unit is characterized in that: the column has a porous stationary phase, a porous pressure adjusting part disposed at least at the flow-in end of the stationary phase, a liquid entering the flow-in end, the pressure adjusting part being harder than the stationary phase, and a covering part that covers the stationary phase and pressure adjusting part; the support body has a first plate and a second plate that are mutually joined, the support body forming a column holding part and a liquid flow passage, the column holding part holding the column between the first plate and the second plate, the liquid flow passage communicating with the column holding part; and pressure applied from the first plate and second plate to the pressure adjusting part is higher than pressure applied to the stationary phase.

According to this structure, the liquid fed under pressure to the liquid flow passage is fed to the stationary phase while the pressure of the liquid is adjusted by the pressure adjusting part. Thus, the unevenness of the liquid passing through the stationary phase is suppressed. Since tight contact at the position of the pressure adjusting part is increased in a state in which the column is held between the first plate and the second plate, liquid feeding withstand pressure can be improved. Pressure more than necessary is not applied to the stationary phase. Therefore, the collapse of the porous holes is suppressed and sufficient analytical performance can be derived.

In the flow passage unit in the present invention, the pressure adjusting part may have smaller porous holes in the vicinity of the outer circumference than at the central portion. Thus, it is possible to assure tight contact between the first plate and the pressure adjusting part and between the second plate and the pressure adjusting part and to assure the functions of the pressure adjusting part.

In the flow passage unit in the present invention, the pressure adjusting part may be provided at both the flow-in end and a flow-out end, the flow-in end and the flow-out end being included in the stationary phase. Thus, it is possible to reliably bring the first plate and second plate into tight contact with each other by the pressure adjusting parts at two positions.

In the flow passage unit in the present invention, in a state in which the column is not supported by the support body, the average diameter of a cross-section at a portion of the column, the portion including the pressure adjusting part, may be larger than 1 times the average diameter of a cross-section at a portion of the column, the portion including the stationary phase, and may be smaller than or equal to 1.1 times. The maximum diameter of the cross-section at the portion of the column, the portion including the stationary phase, may be larger than or equal to 0.96 times the inner diameter of the column holding part and may be smaller than 1.0 times. The minimum diameter of the cross-section at the portion of the column, the portion including the pressure adjusting part, may be larger than 1 times the inner diameter of the column holding part and may be smaller than 1.06 times. Thus, it is possible to enhance tight contact between the first plate and the pressure adjusting part and between the second plate and the pressure adjusting part and to prevent a flow of the liquid passing through the stationary phase from being impeded.

In the flow passage unit in the present invention, withstand pressure when a liquid flows into the liquid flow passage may be 2 megapascals or higher. Thus, highly precise analysis can be performed in a short time.

In the flow passage unit in the present invention, the stationary phase may include a sintered ceramic with a monolithic structure. This sintered ceramic may include porous silica. The first plate and second plate each may be formed from a synthetic resin.

In the flow passage unit in the present invention, the covering part may be formed from, for example, a heat-shrinkable resin, which shrinks by being heated. The heat-shrinkable resin may include polyetheretherketone. In this case, withstand pressure when a liquid flows into the liquid flow passage may be 10 megapascals or higher. Thus, highly precise analysis can be performed in an extremely short time.

According to the present invention, it becomes possible to provide a flow passage unit that can achieve both improvement in liquid feeding withstand pressure and improvement in analytical performance.

DESCRIPTION OF THE PREFERRED EMBODIMENTS

Figure 1A:
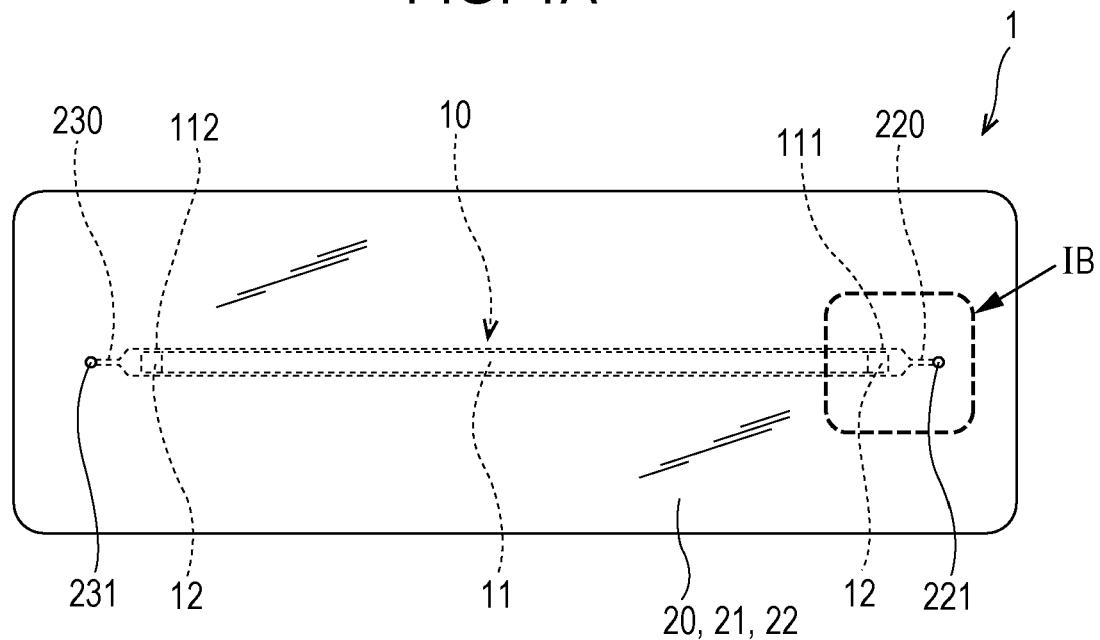
FIGS. 1A and 1B are schematic diagrams illustrating a flow passage unit according to a first embodiment.

Embodiments of the present invention will be described below with reference to the drawings. In the descriptions below, like elements will be denoted by like reference numerals and descriptions will be appropriately omitted for members that have been described once.

First Embodiment

Figure 1B:
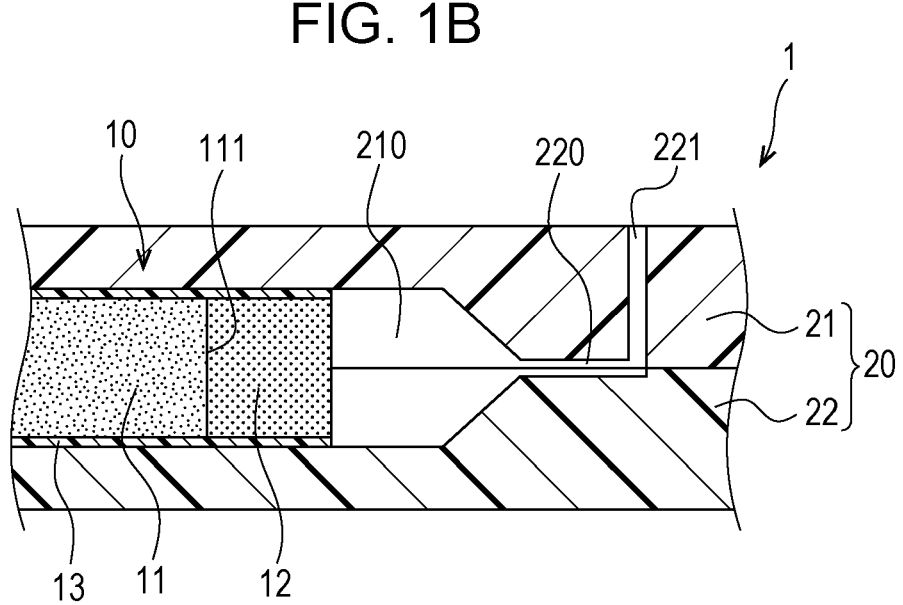

FIGS. 1A and 1B are schematic diagrams illustrating a flow passage unit according to a first embodiment.

FIG. 1A is a plan view of the flow passage unit 1. FIG. 1B is an enlarged cross-sectional view of the portion IB indicated in FIG. 1A.

Figure 2:
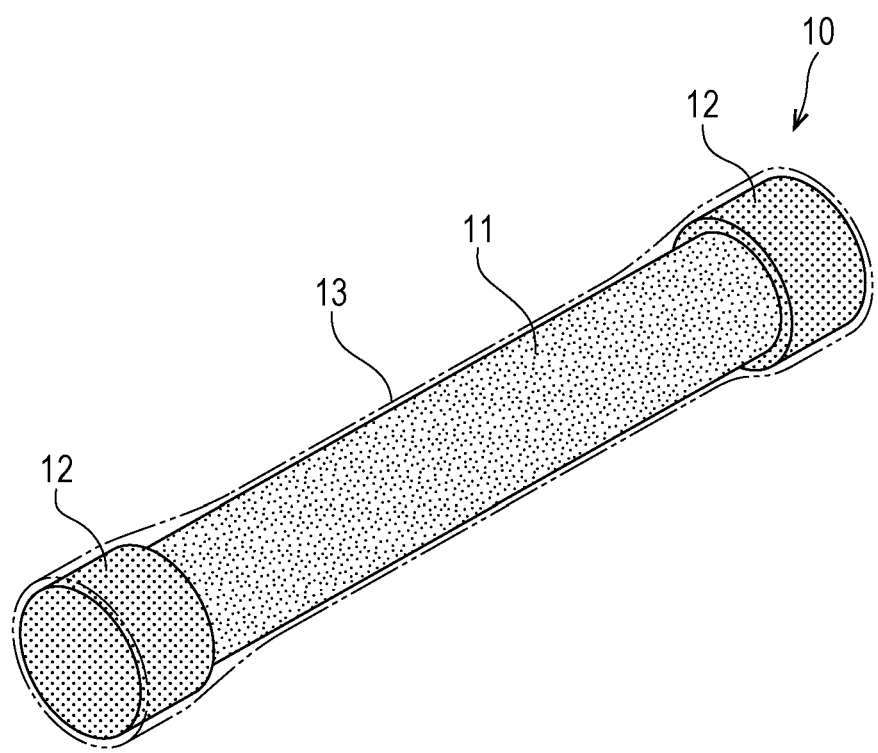
FIG. 2 is a schematic perspective view illustrating a column.

FIG. 2 is a schematic perspective view illustrating a column. In FIG. 2, for convenience of explanation, a covering part 13 is indicated by a dash-dot-dot line.

As indicated in FIGS. 1A and 1B, the flow passage unit 1 according to this embodiment has a column 10 for use in a liquid chromatograph and also has a support body 20 that supports the column 10.

The column 10 has a stationary phase 11, which has a columnar outside shape and is porous, a pressure adjusting part 12, which is provided at least at the flow-in end 111 of the stationary phase 11, a liquid entering the flow-in end 111, and has a columnar outside shape and is porous, and the covering part 13 that covers the stationary phase 11 and pressure adjusting part 12.

The stationary phase 11 has a function that performs an interaction (such as a hydrophobic interaction or an ion exchange) for each component of a sample that passes the stationary phase 11 and separates components from each other. The stationary phase 11 is formed from a porous body or an aggregate of fine particles. The material of the stationary phase 11 is selected from various types of ceramics, polymeric materials, and the like, depending on the type of the sample and the types of the components to be separated. In this embodiment, the stationary phase 11 preferably includes a sintered ceramic with a monolithic structure. The sintered ceramic preferably includes, for example, porous silica. In particular, silica monolith that is totally formed from integrated silica gel is used.

The pressure adjusting part 12 has a function that adjusts the flow of a liquid. That is, the pressure adjusting part 12 has a porous body that has almost the same pressure loss as the stationary phase 11. By providing the pressure adjusting part 12, the flow of a liquid to be fed under pressure is adjusted, so disturbance of the liquid passing through the stationary phase 11 is suppressed.

The pressure adjusting part 12 also has a filter function and a function of a diffusing plate. In addition, the pressure adjusting part 12 has a harder material than the stationary phase 11.

In this embodiment, the pressure adjusting part 12 is preferably provided at both the flow-in end 111 and flow-out end 112 of the stationary phase 11. Thus, a first plate 21 and the column 10 as well as a second plate 22 and the column 10 can be reliably placed in tight contact by the pressure adjusting parts 12 at two positions.

A heat-shrinkable resin, which shrinks by being heated, for example, is preferably used for the covering part 13. The covering part 13 is tubular. When the stationary phase 11 and pressure adjusting parts 12 are accommodated in this tube and the heating the covering part 13 is then heated, the column 10 having a columnar outer shape is structured. There is no limitation on the type of the heat-shrinkable resin. Tetrafluoroethylene-hexafluoropropylene copolymer (4, 6 fluorinated, FEP), polyetheretherketone (PEEK), and the like are exemplified. When a liquid is supplied from a liquid flow passage 220 into a column holding part 210, a pressure of several megapascals (MPa) or more is applied to the interior of the column 10. In this case as well, to make a clearance less likely to be generated between the stationary phase 11 and the covering part 13, it is preferable to use PEEK as the heat-shrinkable resin. When PEEK is used as the heat-shrinkable resin, even if the pressure of the liquid becomes 10 MPa higher, a leading, which will be described later, is less likely to appear in a waveform.

The support body 20 has the first plate 21 and second plate 22 that are mutually joined. By mutually joining the first plate 21 and second plate 22, a column holding part 210 and a fluid flow passages 220 and 230 communicating with the column holding part 210 are formed. The column holding part 210 is a space in which the column 10 is accommodated. The column 10 is placed in the column holding part 210 and is sandwiched between the first plate 21 and the second plate 22.

A flow-in port 221 for a liquid is formed in the surface of the first plate 21. The flow-in port 221 is the inlet of the liquid flow passage 220. The liquid flow passage 220 extends from the flow-in port 221 to toward the second plate 22, and is then bent at a boundary position between the first plate 21 and the second plate 22 so as to communicate with the column holding part 210.

A flow-out part 231 for a liquid is formed in the surface of the first plate 21. The flow-out part 231 is the outlet of the fluid flow passage 230. The fluid flow passage 230 extends from the flow-out part 231 toward the second plate 22, and is then bent at a boundary position between the first plate 21 and the second plate 22 so as to communicate with the column holding part 210.

A liquid passes from the flow-in port 221 through the liquid flow passage 220 and is fed to the column 10 in the column holding part 210. The liquid then passes through the column 10, after which the liquid passes through the fluid flow passage 230 and is discharged from the flow-out part 231.

A synthetic resin, for example, is preferably used to form the first plate 21 and second plate 22. An example of a synthetic resin to be used is a cyclic polyolefin resin (COP). The first plate 21 and second plate 22 are joined by, for example, thermal compression bonding. Alternatively, the first plate 21 and second plate 22 may be joined with an adhesive such as an ultraviolet curable resin.

With the flow passage unit 1 according to this embodiment, in a state in which the column 10 is sandwiched between the first plate 21 and the second plate 22, pressure applied from the first plate 21 and second plate 22 to the pressure adjusting part 12 is higher than pressure applied to the stationary phase 11. This difference in pressure can be measured with a strain measuring device as stress exerted on the first plate 21 and second plate 22.

That is, in the state in which the column 10 is sandwiched between the first plate 21 and the second plate 22, the first plate 21 and the second plate 22 are placed in more tight contact at the position of the pressure adjusting part 12 than at the position of the stationary phase 11. Thus, liquid feeding withstand pressure can be improved (for example, a liquid feeding withstand pressure of 2 MPa or more). In addition, pressure more than necessary is not applied to the stationary phase 11 from the first plate 21 and second plate 22. Thus, the collapse of the porous holes in the stationary phase 11 is suppressed and sufficient analytical performance can be derived.

FIGS. 3A to 3D are schematic diagrams illustrating the dimensions of individual parts.

Figure 3A:
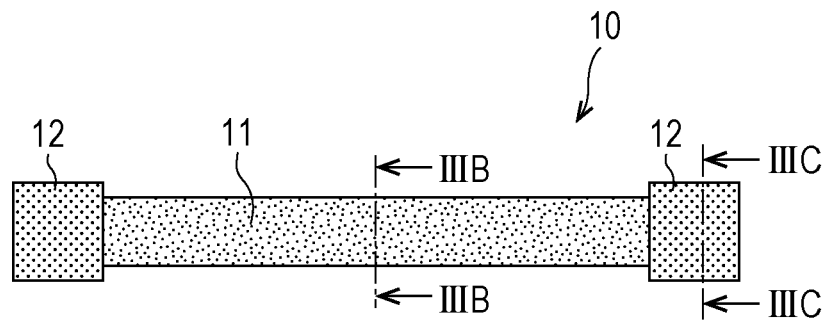
FIGS. 3A to 3D are schematic diagrams illustrating the dimensions of individual parts.
Figure 3B:
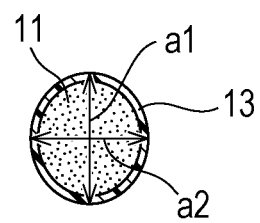
Figure 3C:
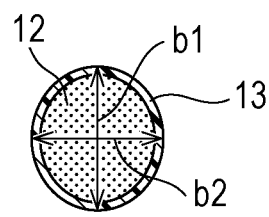
Figure 3D:
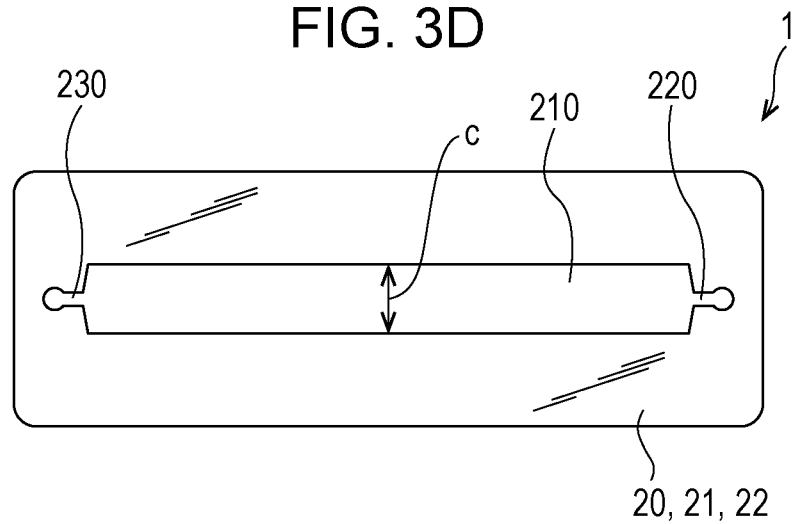

FIG. 3A illustrates the column 10. FIG. 3B illustrates dimensions at the cross-section taken along line IIIB-IIIB in FIG. 3A. FIG. 3C illustrates dimensions at the cross-section taken along line IIIC-IIIC in FIG. 3A. FIG. 3D illustrates a dimension of the column holding part 210 in the support body 20. In FIG. 3A, the column 10 is not supported by the support body 20. In FIG. 3A, the covering part 13 is omitted.

The side surface of the column 10 is formed from the surface of the covering part 13. In a state in which the column 10 is not supported by the column holding part 210, the shape of a cross-section at a portion of the column 10, the portion including the stationary phase 11, is substantially elliptical (see FIG. 3B). The shape of a cross-section at a portion of the column 10, the portion including the pressure adjusting part 12, is also substantially elliptical (see FIG. 3C). The shape of the cross-section of the column holding part 210 is substantially circular.

In FIG. 3B, a1 indicates the maximum diameter (referred to below as the maximum diameter of the stationary phase portion) of the cross-section at the portion of the column 10, the portion including the stationary phase 11, and a2 indicates the minimum diameter (referred to below as the minimum diameter of the stationary phase portion) of the cross-section at the portion of the column 10, the portion including the stationary phase 11. In FIG. 3C, b1 indicates the maximum diameter (referred to below as the maximum diameter of the pressure adjusting portion) of the cross-section at the portion of the column 10, the portion including the pressure adjusting part 12, and b2 indicates the minimum diameter (referred to below as the minimum diameter of the pressure adjusting portion) of the cross-section at the portion of the column 10, the portion including the pressure adjusting part 12. In FIG. 3D, c indicates the inner diameter of the column holding part 210.

The average diameter (referred to below as the average diameter of the stationary phase portion) of the cross-section at the portion of the column 10, the portion including the stationary phase 11, will be denoted a, and the average diameter (referred to below as the average diameter of the pressure adjusting portion) of the cross-section at the portion of the column 10, the portion including the pressure adjusting part 12, will be denoted b.

In the above dimensions, the ratio (a1/a2) of the maximum diameter a1 of the stationary phase portion to the minimum diameter a2 of the stationary phase portion is about 1.0071. The ratio (b1/b2) of the maximum diameter b1 of the pressure adjusting portion to the minimum diameter b2 of the pressure adjusting portion is about 1.0173. The average diameter b of the pressure adjusting portion is larger than the average diameter a of the stationary phase portion. Specifically, b/a may be larger than 1 and is equal to or smaller than 1.1. Preferably, b/a is larger than 1.0 and is equal to or smaller than 1.05. More preferably, b/a is equal to or larger than 1.012 and is equal to or smaller than 1.020. The minimum diameter b2 of the pressure adjusting portion is larger than the minimum diameter a2 of the stationary phase portion.

It is desirable for the maximum diameter a1 of the stationary phase portion to be smaller than the inner diameter c of the column holding part 210. Specifically, a1/c may be equal to or larger than 0.96 and is smaller than 1.0; preferably, a1/c is equal to or larger than 0.980 and is equal to or smaller than 0.988.

It is desirable for the minimum diameter b2 of the pressure adjusting portion to be larger than the inner diameter c of the column holding part 210. Specifically, b2/c may be larger than 1.0 and is equal to or smaller than 1.06; preferably, b2/c is equal to or larger than 1.008 and is equal to or smaller than 1.020.

Examples of specific dimensions will be indicated below.

Average diameter a of the stationary phase portion=2.419 mm

Maximum diameter a1 of the stationary phase portion=2.427 mm

Minimum diameter a2 of the stationary phase portion=2.410 mm

Average diameter b of the pressure adjusting portion=2.512 mm

Maximum diameter b1 of the pressure adjusting portion=2.533 mm

Minimum diameter b2 of the pressure adjusting portion=2.490 mm

Inner diameter c of the column holding part 210=2.44 mm (±0.02 mm)

When the dimensions of the column 10 and column holding part 210 are set as described above and the column 10 is accommodated in the column holding part 210 and is then sandwiched between the first plate 21 and the second plate 22, the pressure adjusting part 12 is appropriately collapsed. Therefore, the side surface of the portion of the column 10, the portion including the pressure adjusting part 12, is placed in tight contact with the first plate 21 and second plate 22. In this case, porous holes in the vicinity of the outer circumference of the pressure adjusting part 12 preferably become smaller than porous holes at its central portion. That is, porous holes at the central portion of the pressure adjusting part 12 are not collapsed, and only porous holes in the vicinity of its outer circumference are slightly collapsed.

The stationary phase 11 is not subjected to a force more than necessary from the first plate 21 and second plate 22. Due to this state, it is possible to enhance tight contact between the first plate 21 and the portion of the column 10, the portion including the pressure adjusting part 12 and between the second plate 22 and that portion, and it is also possible to prevent a flow of the liquid passing through the stationary phase 11 from being impeded.

Here, a case in which tight contact between the column 10 and the support body 20 is insufficient will be descried.

Figure 4A:
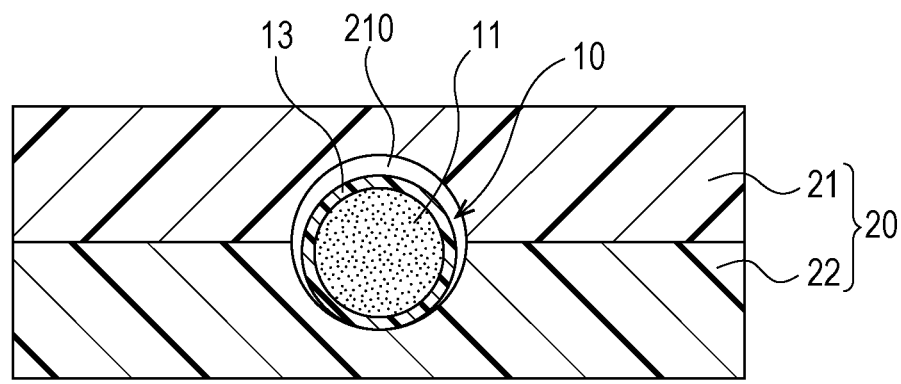
FIGS. 4A and 4B illustrate a state of the column and an example of a liquid chromatogram.

FIG. 4A illustrates a state in which the outer diameter of the column 10 is smaller than the inner diameter of the column holding part 210 (a schematic cross-section of a portion of the stationary phase 11 as viewed in the axial direction of the column 10). In this state, a clearance is generated between the column 10 and the support body 20. In this case, part of the liquid fed under pressure passes through a clearance between the covering part 13 and the first plate 21 and a clearance between the covering part 13 and the second plate 22.

Figure 4B:
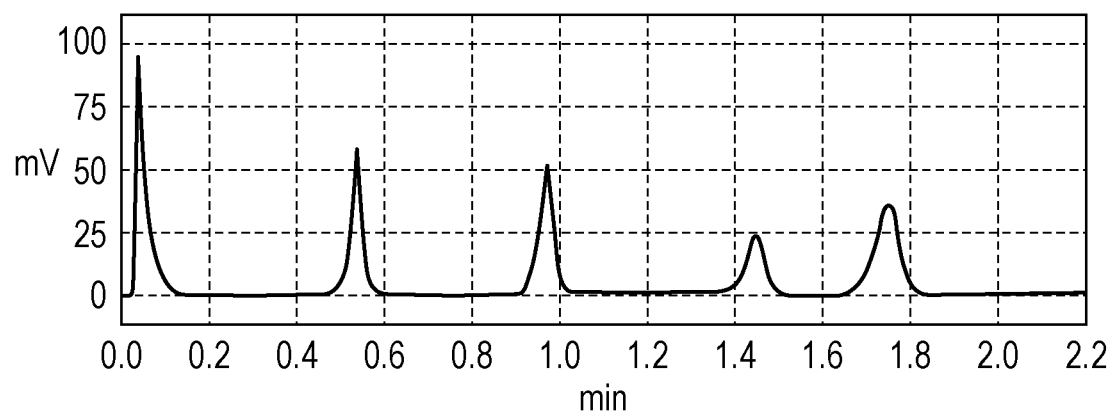

FIG. 4B illustrates an example of a liquid chromatogram analyzed in the state of the column 10 indicated in FIG. 4A. Since the liquid passes through the clearance between the covering part 13 and the first plate 21 and the clearance between the covering part 13 and the second plate 22, a waveform peak appears near a time of 0.

Figure 5A:
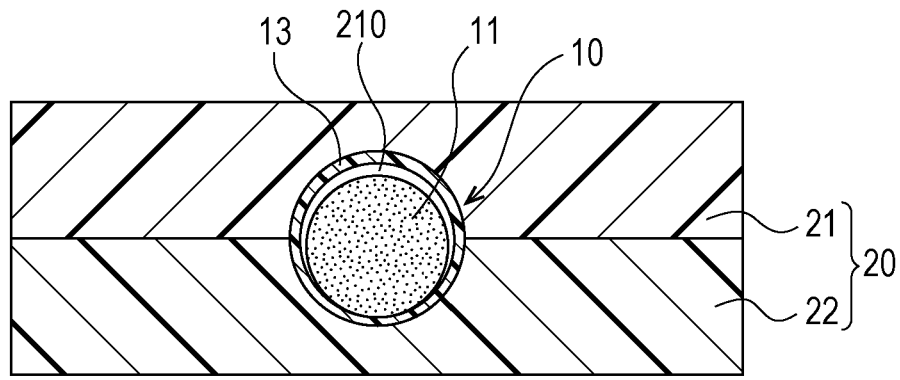
FIGS. 5A to 5C illustrate another state of the column and examples of liquid chromatograms.

FIG. 5A illustrates a state in which the outer diameter of the pressure adjusting part is smaller than the inner diameter of the column holding part 210 (a schematic cross-section of a portion of the stationary phase 11 as viewed in the axial direction of the column 10). In this state, the covering part 13 is expanded by the pressure of the liquid and a clearance is generated between the covering part 13 and the stationary phase 11. In this case, while the liquid passes through the stationary phase 11, part of the liquid leaks into the clearance between the covering part 13 and the stationary phase 11. That is, it is not possible to obtain analytical performance of a column.

Figure 5B:
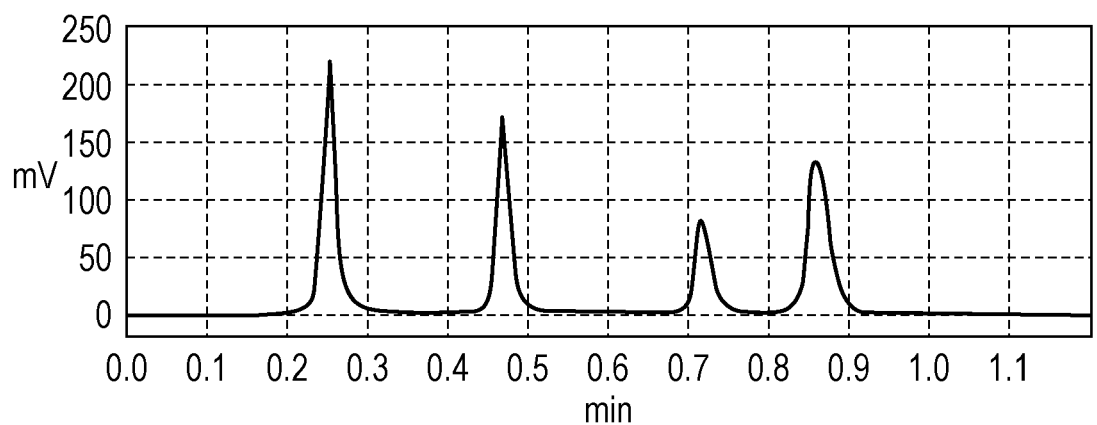
Figure 5C:
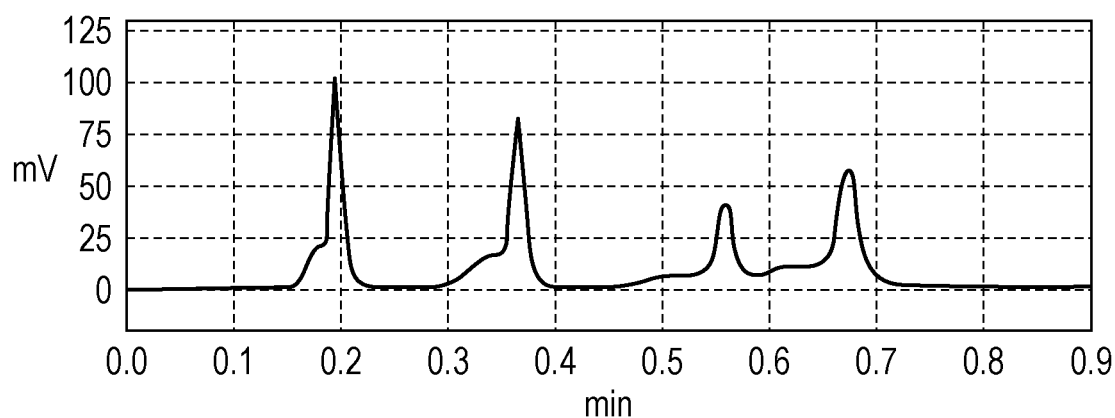

FIGS. 5B and 5C illustrate examples of liquid chromatograms analyzed in the state of the column indicated in FIG. 5A. FIG. 5B illustrates a case in which the pressure of the liquid is low. FIG. 5C illustrates a case in which the pressure of the liquid is high. As the pressure of the liquid becomes high, the clearance between the covering part 13 and the stationary phase 11 is more expanded and more liquid leaks. Thus, a leading appears on a waveform. That is, when the pressure of the liquid becomes high, sufficient analytical performance cannot be obtained, so withstand pressure cannot be made high.

In this embodiment, tight contact with the support body 20 can be obtained with the pressure adjusting part 12 of the column 10. Thus, withstand pressure can be made high while ensuring sufficient analytical performance.

Another Embodiment

Figure 6:
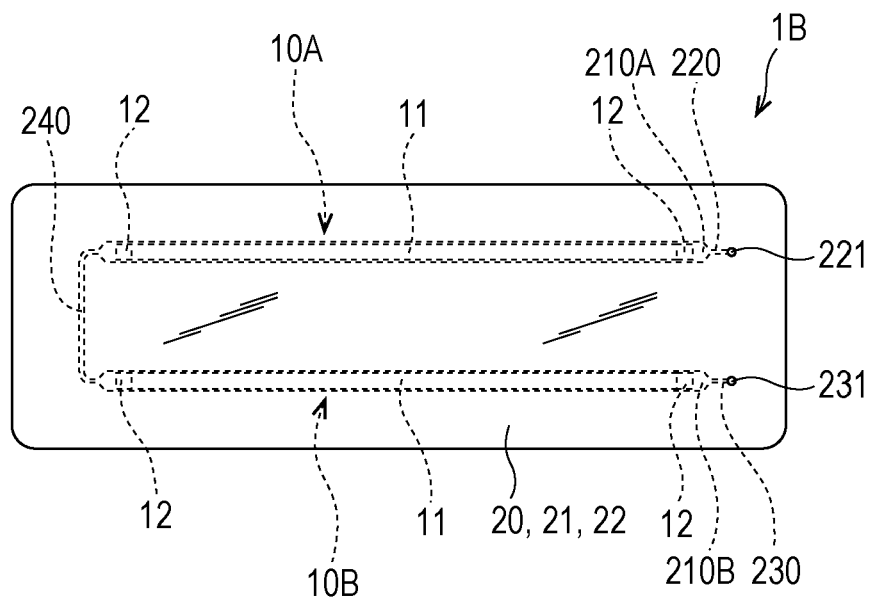
FIG. 6 is a schematic plan view illustrating an example of the structure of another flow passage unit.

FIG. 6 is a schematic plan view illustrating an example of the structure of another flow passage unit.

This flow passage unit 1B is structured so that a plurality of columns are supported by the support body 20. In the example illustrated in FIG. 6, two columns 10A and 10B are supported by the support body 20. The support body 20 is provided with a column holding part 210A to hold the column 10A and a column holding part 210B to hold the column 10B. The column holding part 210A communicates with the liquid flow passage 220, and the column holding part 210B communicates with the fluid flow passage 230. A fluid flow passage 240 is provided between the column holding part 210A and the column holding part 210B.

In this flow passage unit 1B, the two column holding parts 210A and 210B are disposed in parallel. The fluid flow passage 240, which is U-shaped, is disposed between them. Thus, after a liquid has been fed from the flow-in port 221 to the liquid flow passage 220, the liquid passes through the column 10A and is fed to the column 10B through the fluid flow passage 240. Then, the liquid passes through the column 10B and fluid flow passage 230, after which the liquid is discharged from the flow-out part 231. With this flow passage unit 1B, analysis is performed in a state in which the two columns 10A and 10B are connected in series.

The column 10A and 10B used in the flow passage unit 1B have a structure similar to the structure of the column 10 used in the flow passage unit 1. Thus, with the pressure adjusting part 12 used in each of the columns 10A and 10B, tight contact with the support body 20 can be assured, withstand pressure can be made high, and analytical performance can be made high.

Next, examples and comparative examples will be described.

FIRST EXAMPLE

Figure 7:
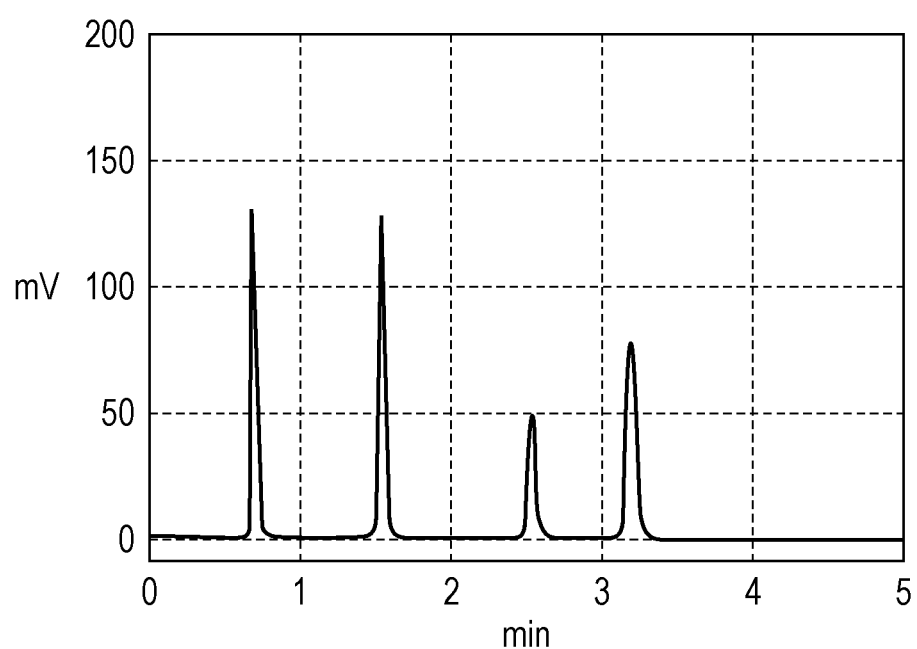
FIG. 7 illustrates a liquid chromatogram obtained by using a flow passage unit according to a first example.

FIG. 7 illustrates a liquid chromatogram obtained by using a flow passage unit according to a first example.

Measurement conditions in high performance liquid chromatography (HPLC) are as follows.

These measurement conditions are also applied to the examples and comparative examples described below.

Analyzing apparatus: LC-2010AHT manufactured by Shimadzu Corporation

Sample: uracil, methyl benzoate, toluene, and naphthalene

Amount of injection: 0.2 μL

Column oven temperature: 25° C.

Mobile phase: Acetonitrile/water=60/40 (vol/vol)

Detection: UV detector, 254 nm, semi-micro cell

In the first example, a structure as described below is used as the flow passage unit.

If the maximum diameter of the stationary phase portion is denoted a1, the minimum diameter of the pressure adjusting portion is denoted b2, and the inner diameter of the column holding part 210 is denoted c, then b2−c is +40 micrometers (μm) and a1−c is −48 μm. The flow rate of the liquid to the flow passage unit according to the first example is 0.4 milliliter/minute (ml/min).

In this example, the theoretical plate number (theoretical plate number for the peak waveform with the longest hold time; the same applies hereinafter) is 12525, the symmetry factor (symmetry factor for the peak waveform with the longest hold time; the same applies hereinafter) is 1.08, and withstand pressure is 10.1 megapascals (MPa).

SECOND EXAMPLE

Figure 8A:
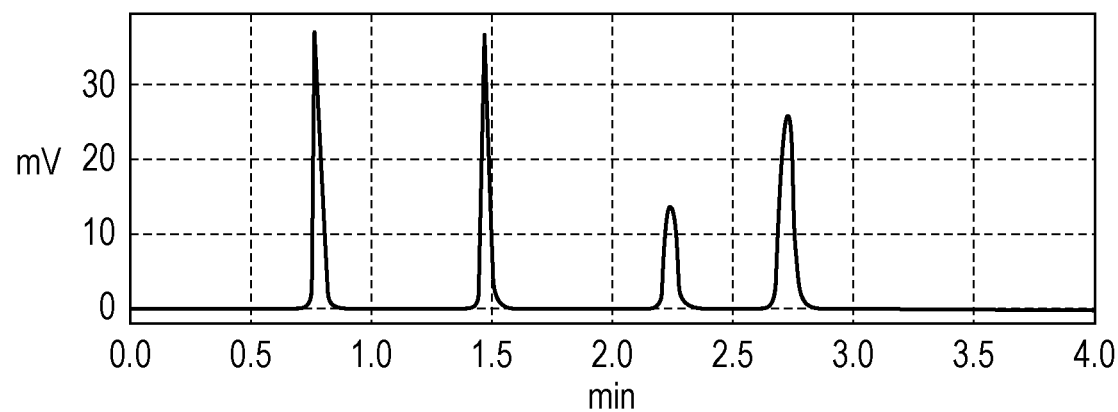
FIGS. 8A and 8B illustrate liquid chromatograms obtained by using a flow passage unit according to a second example.
Figure 8B:
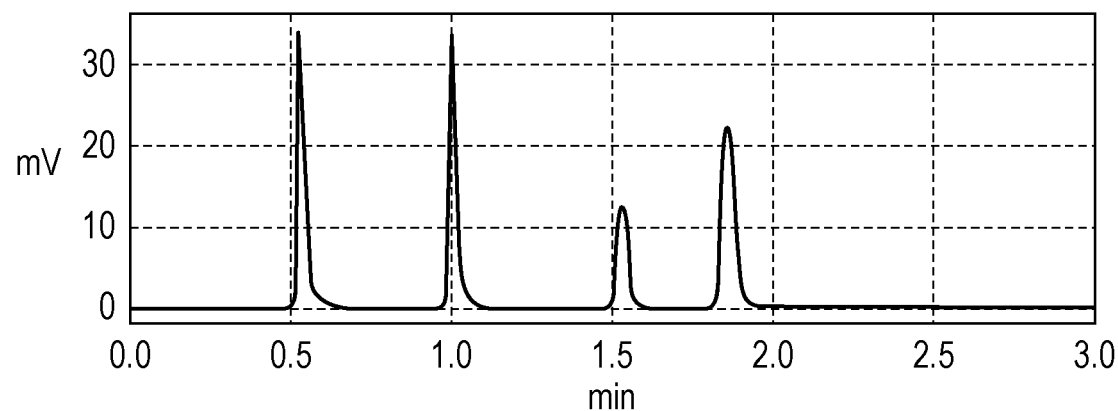

FIGS. 8A and 8B illustrate liquid chromatograms obtained by using a flow passage unit according to a second example.

In the second example, a structure as described below is used as the flow passage unit.

If the maximum diameter of the stationary phase portion is denoted a1, the minimum diameter of the pressure adjusting portion is denoted b2, and the inner diameter of the column holding part 210 is denoted c, then b2−c is +21 μm and a1−c is −41 μm.

FIG. 8A illustrates a liquid chromatogram in a case in which the flow rate of the liquid to the flow passage unit according to the second example is 0.4 ml/min.

In this example, the theoretical plate number is 13335, the symmetry factor is 1.083, and withstand pressure is 7.1 MPa.

FIG. 8B illustrates a liquid chromatogram in a case in which the flow rate of the liquid to the flow passage unit according to the second example is 0.6 ml/min.

In this example, the theoretical plate number is 12697, the symmetry factor is 1.101, and withstand pressure is 11.6 MPa.

That is, even if the flow rate is increased from 0.4 ml/min to 0.6 ml/min, a sufficient theoretical plate number, a sufficient symmetry factor, and sufficient withstand pressure can be obtained.

THIRD EXAMPLE

Figure 9A:
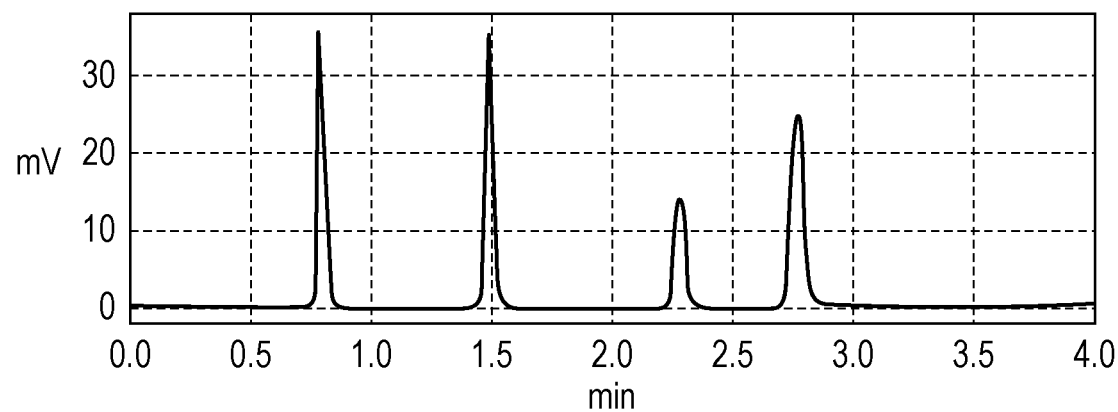
FIGS. 9A and 9B illustrate liquid chromatograms obtained by using a flow passage unit according to a third example.
Figure 9B:
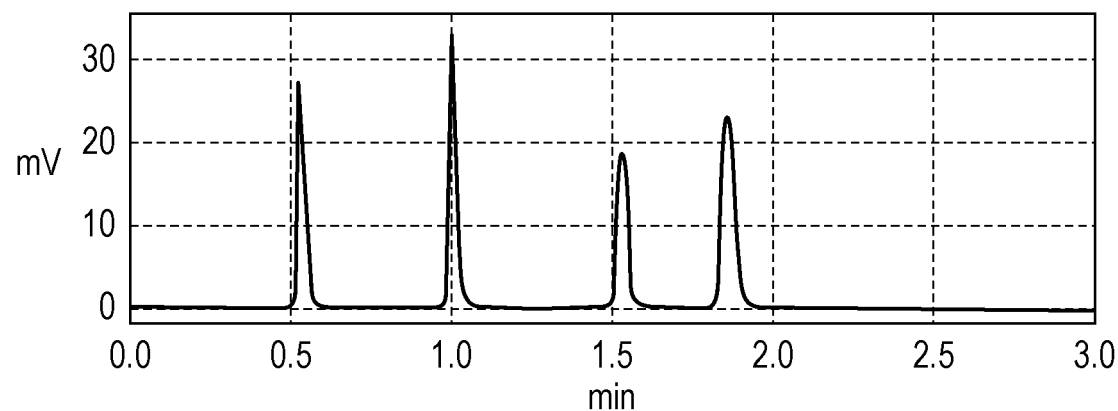

FIGS. 9A and 9B illustrate liquid chromatograms obtained by using a flow passage unit according to a third example.

In the third example, a structure as described below is used as the flow passage unit.

If the maximum diameter of the stationary phase portion is denoted a1, the minimum diameter of the pressure adjusting portion is denoted b2, and the inner diameter of the column holding part 210 is denoted c, then b2−c is +28 μm and a1−c is −27 μm.

FIG. 9A illustrates a liquid chromatogram in a case in which the flow rate of the liquid to the flow passage unit according to the third example is 0.4 ml/min.

In this example, the theoretical plate number is 14599, the symmetry factor is 1.075, and withstand pressure is 6.3 MPa.

FIG. 9B illustrates a liquid chromatogram in a case in which the flow rate of the liquid to the flow passage unit according to the third example is 0.6 ml/min.

In this example, the theoretical plate number is 13347, the symmetry factor is 1.103, and withstand pressure is 10.0 MPa.

That is, even if the flow rate is increased from 0.4 ml/min to 0.6 ml/min, a sufficient theoretical plate number, a sufficient symmetry factor, and sufficient withstand pressure can be obtained.

FIRST COMPARATIVE EXAMPLE

Figure 10A:
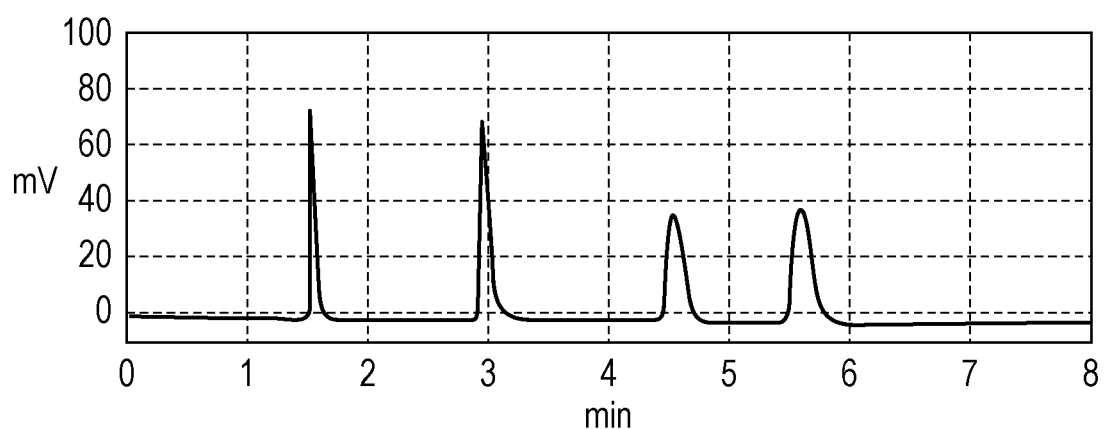
FIGS. 10A and 10B illustrate liquid chromatograms obtained by using a flow passage unit according to a first comparative example.
Figure 10B:
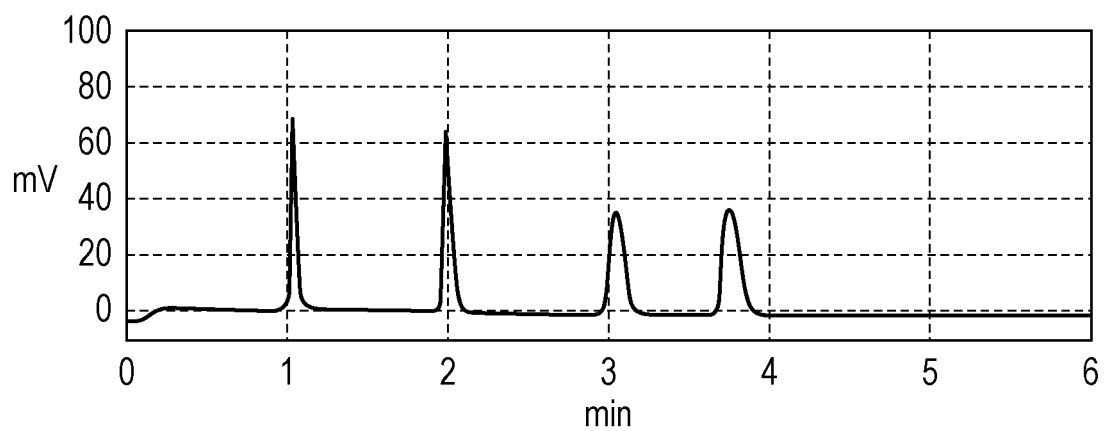

FIGS. 10A and 10B illustrate liquid chromatograms obtained by using a flow passage unit according to a first comparative example.

In the first comparative example, a structure as described below is used as the flow passage unit.

If the maximum diameter of the stationary phase portion is denoted a1, the minimum diameter of the pressure adjusting portion is denoted b2, and the inner diameter of the column holding part 210 is denoted c, then b2−c is +36 μm and a1−c is +35 μm.

FIG. 10A illustrates a liquid chromatogram in a case in which the flow rate of the liquid to the flow passage unit according to the first comparative example is 0.2 ml/min.

In this example, the theoretical plate number is 6369, the symmetry factor is 1.36, and withstand pressure is 3.1 MPa.

FIG. 10B illustrates a liquid chromatogram in a case in which the flow rate of the liquid to the flow passage unit according to the first comparative example is 0.3 ml/min.

In this example, the theoretical plate number is 6464, the symmetry factor is 1.43, and withstand pressure is 4.5 MPa.

SECOND COMPARATIVE EXAMPLE

Figure 11A:
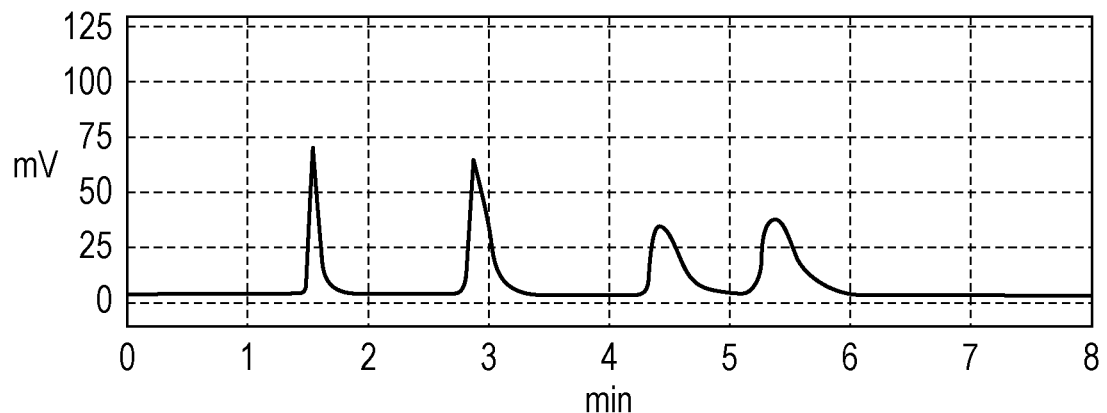
FIGS. 11A to 11C illustrate liquid chromatograms obtained by using a flow passage unit according to a second comparative example.
Figure 11B:
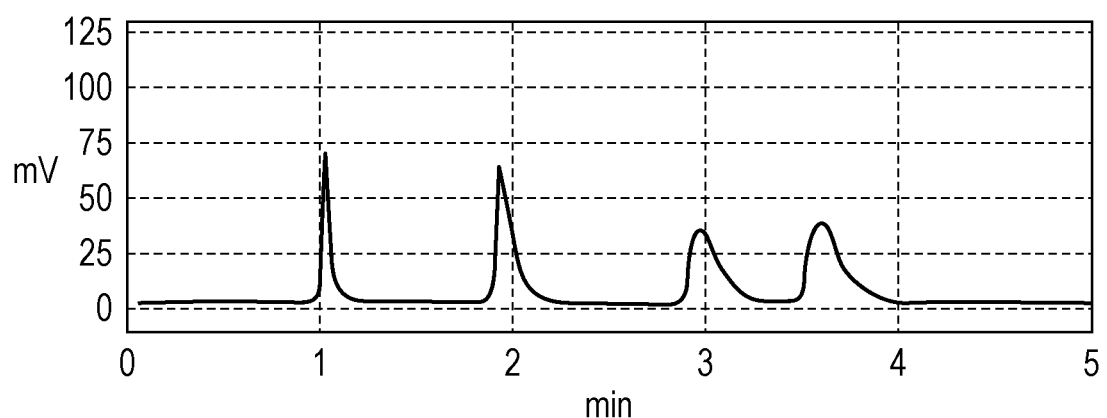
Figure 11C:
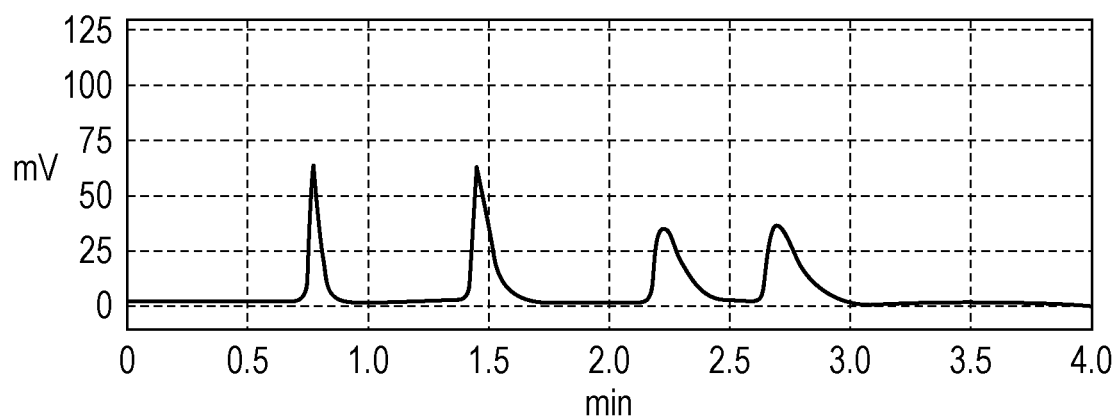

FIGS. 11A to 11C illustrate liquid chromatograms obtained by using a flow passage unit according to a second comparative example.

In the second comparative example, a structure as described below is used as the flow passage unit.

If the maximum diameter of the stationary phase portion is denoted a1, the minimum diameter of the pressure adjusting portion is denoted b2, and the inner diameter of the column holding part 210 is denoted c, then b2−c is +36 μm and a1−c is +22 μm.

FIG. 11A illustrates a liquid chromatogram in a case in which the flow rate of the liquid to the flow passage unit according to the second comparative example is 0.2 ml/min.

In this example, the theoretical plate number is 1861, the symmetry factor is 1.36, and withstand pressure is 2.7 MPa.

FIG. 11B illustrates a liquid chromatogram in a case in which the flow rate of the liquid to the flow passage unit according to the second comparative example is 0.3 ml/min.

In this example, the theoretical plate number is 2080, the symmetry factor is 2.06, and withstand pressure is 4.1 MPa.

FIG. 11C illustrates a liquid chromatogram in a case in which the flow rate of the liquid to the flow passage unit according to the second comparative example is 0.4 ml/min.

In this example, the theoretical plate number is 2094, the symmetry factor is 2.02, and withstand pressure is 5.4 MPa.

As described above, according to the embodiments, it is possible to provide a flow passage unit that can achieve both improvement in liquid feeding withstand pressure and improvement in analytical performance.

Although embodiments and other exemplary structures have been described above, the present invention is not limited to these examples. In these embodiments, for example, flow passage units that use one or two columns have been exemplified, but even a flow passage unit that uses three or more columns is also applicable. Although, in these embodiments, the axis of the columnar column is linear, this is not a limitation. The axis of the column may have a bent portion. In addition, the scope of the present invention also includes embodiments obtained as a result of adding or deleting constituent element to or from the embodiments and other exemplary structures described above, performing design changes to them, or appropriately combining the features of the embodiment and other exemplary structures as long as the obtained embodiments are within the intended scope of the present invention; the additions, deletions, design changes, or combination is effected by a person having ordinary skill in the art.

What is claimed is:
1. A flow passage unit comprising:
a column for use in a liquid chromatograph;
a support body that supports the column;
a fluid flow passage formed at the support body, wherein the column has a porous stationary phase,
a porous pressure adjusting part disposed between the fluid flow passage and a flow-in end of the stationary phase, a liquid entering the flow-in end, the pressure adjusting part being harder than the stationary phase, and a covering part that covers the stationary phase and the pressure adjusting part, the support body has a first plate and a second plate that are mutually joined, the support body forming a column holding part and a liquid flow passage, the column holding part holding the column between the first plate and the second plate, the liquid flow passage being parallel to a first axis and changing direction to a second axis that is perpendicular to the first axis with respect to the first and second plates, the liquid flow passage communicating with the column holding part, a diameter of a cross-section at the pressure adjusting part is larger than a diameter of a cross-section at the stationary phase, and a pressing force applied from the first plate and the second plate to the pressure adjusting part is higher than a pressing force applied to the stationary phase.

2. The flow passage unit according to claim 1, wherein the pressure adjusting part has a smaller porous hole near an outer circumference than at a central portion.

3. The flow passage unit according to claim 1, wherein the pressure adjusting part is provided at both the flow-in end and a flow-out end for the liquid, the flow-in end and the flow-out end being included in the stationary phase.

4. The flow passage unit according to claim 2, wherein the pressure adjusting part is provided at both the flow-in end and a flow-out end for the liquid, the flow-in end and the flow-out end being included in the stationary phase.

5. The flow passage unit according to claim 4, wherein in a state in which the column is not supported by the support body, an average diameter of a cross-section at a portion of the column, the portion including the pressure adjusting part, is larger than 1 times an average diameter of a cross-section at a portion of the column, the portion including the stationary phase, and is smaller than or equal to 1.1 times.

6. The flow passage unit according to claim 4, wherein a maximum diameter of a cross-section at a portion of the column, the portion including the stationary phase, is larger than or equal to 0.96 times an inner diameter of the column holding part and is smaller than 1.0 times.

7. The flow passage unit according to claim 5, wherein a maximum diameter of a cross-section at a portion of the column, the portion including the stationary phase, is larger than or equal to 0.96 times an inner diameter of the column holding part and is smaller than 1.0 times.

8. The flow passage unit according to claim 4, wherein a minimum diameter of a cross-section at a portion of the column, the portion including the pressure adjusting part, is larger than 1 times an inner diameter of the column holding part and is smaller than 1.06 times.

9. The flow passage unit according to claim 5, wherein a minimum diameter of a cross-section at a portion of the column, the portion including the pressure adjusting part, is larger than 1 times an inner diameter of the column holding part and is smaller than 1.06 times.

10. The flow passage unit according to claim 6, wherein a minimum diameter of a cross-section at a portion of the column, the portion including the pressure adjusting part, is larger than 1 times an inner diameter of the column holding part and is smaller than 1.06 times.

11. The flow passage unit according to claim 7, wherein a minimum diameter of a cross-section at a portion of the column, the portion including the pressure adjusting part, is larger than 1 times an inner diameter of the column holding part and is smaller than 1.06 times.

12. The flow passage unit according to claim 11, wherein withstand pressure when the liquid flows into the liquid flow passage is 2 megapascals or higher.

13. The flow passage unit according to claim 11, wherein the stationary phase includes a sintered ceramic with a monolithic structure.

14. The flow passage unit according to claim 13, wherein the sintered ceramic includes porous silica.

15. The flow passage unit according to claim 14, wherein the first plate and the second plate each are formed from a synthetic resin.

16. The flow passage unit according to claim 15, wherein the covering part is formed from a heat-shrinkable resin, which shrinks by being heated.

17. The flow passage unit according to claim 16, wherein the heat-shrinkable resin includes polyetheretherketone.

18. The flow passage unit according to claim 17, wherein withstand pressure when the liquid flows into the liquid flow passage is 10 megapascals or higher.

19. The flow passage unit according to claim 1, wherein the liquid flow passage extends from an inlet thereto toward the second plate, the inlet formed in the surface of the first plate.

20. A flow passage unit comprising:
a column for use in a liquid chromatograph;
a support body that supports the column;
a fluid flow passage formed at the support body, wherein the column has a porous stationary phase,
a porous pressure adjusting part disposed between the fluid flow passage and a flow-in end of the stationary phase, a liquid entering the flow-in end, the pressure adjusting part being harder than the stationary phase, and
a covering part that covers the stationary phase and the pressure adjusting part,
the support body has a first plate and a second plate that are mutually joined, the support body forming a column holding part and a liquid flow passage, the column holding part holding the column between the first plate and the second plate, the liquid flow passage communicating with the column holding part, the first and second plates surrounding the column, and the liquid flow passage including an inlet and extending from the inlet to the second plate,
a diameter of a cross-section at the pressure adjusting part is larger than a diameter of a cross-section at the stationary phase, and
a pressing force applied from the first plate and the second plate to the pressure adjusting part is higher than a pressing force applied to the stationary phase.

* * * * *